United States Patent [19]

Langner et al.

[11] Patent Number: 4,518,074
[45] Date of Patent: May 21, 1985

[54] ARRANGEMENT AND A METHOD FOR TRANSFERRING PRODUCTS IN METAL PROCESSING INSTALLATIONS

[75] Inventors: Carl Langner, Monsey, N.Y.; Michael Poran, Washington Township, Bergen County; Geza Szarka, Glen Rock, both of N.J.

[73] Assignee: Concast Incorporated, Montvale, N.J.

[21] Appl. No.: 487,207

[22] Filed: Apr. 21, 1983

[51] Int. Cl.³ .............................................. B65G 25/00
[52] U.S. Cl. ................................. 198/425; 198/462; 198/485; 164/269
[58] Field of Search ............... 198/457, 485, 614, 487, 198/432, 433, 488, 774, 598, 431, 425, 462; 414/83, 745; 164/263, 269, 270.1, 76.1

[56] References Cited

U.S. PATENT DOCUMENTS 3,631,959  1/1972  Gipperich ......................... 198/614

FOREIGN PATENT DOCUMENTS 26248    7/1956  Fed. Rep. of Germany ...... 198/485
2632714  1/1978  Fed. Rep. of Germany ...... 164/269
151288  10/1981  German Democratic Rep. ................................... 198/485
425781  10/1974  U.S.S.R. ............................. 198/485

Primary Examiner—Joseph E. Valenza
Assistant Examiner—Daniel R. Alexander
Attorney, Agent, or Firm—Peter K. Kontler; Tobias Lewenstein

[57] ABSTRACT

Hot, elongated metallic products are delivered to a horizontal roller table and then transferred to one side of the latter transverse to the longitudinal dimensions of the products. The transfer arrangement for the products includes several pairs of I-beams which stretch from one side of the roller table to the other and are upwardly inclined in the direction of transfer. The I-beams of each pair are spaced from one another, and a wheeled carriage is located in the gap between the I-beams of each pair. The wheels of the carriages are situated between the flanges of the respective I-beams. The carriages are aligned with one another in the longitudinal direction of the products and are driven in synchronism. This permits each product in the path of the carriages to be engaged by all of the carriages simultaneously. As the carriages travel in the transfer direction, the carriages sequentially lift the products from the roller table along a direction which is inclined to the horizontal. This reduces sliding movement of the products on the roller table. The carriages also group the products during travel in the transfer direction.

53 Claims, 6 Drawing Figures

ARRANGEMENT AND A METHOD FOR TRANSFERRING PRODUCTS IN METAL PROCESSING INSTALLATIONS

BACKGROUND OF THE INVENTION

The invention relates generally to an arrangement and a method for transferring products in metal processing installations.

More particularly, the invention relates to an arrangement and a method for transferring hot metallic products.

The efficient operation of a metal making plant is closely linked to the safe and efficient transfer of the hot metallic products made in such plant. In certain cases, however, there are problems which adversely affect the operating efficiency.

A particlar case is an apparatus for the continuous casting of steel. The continuously cast, semifinished products formed in an apparatus of this type issue onto a roller table which is known as a runout table and is located at the downstream end of the apparatus. The continuously cast products are at a very high temperature, and may even be red hot, when they are discharged onto the runout table.

From the runout table, the continuously cast products are transferred to a cooling bed. Transfer of the products from the runout table to the cooling bed must be accomplished fairly rapidly since additional products are discharged onto the runout table at regular intervals.

In apparatus for continuously casting products such as billets having a small cross section, two or more products are generally discharged onto the runout table at a fixed distance from one another. The products are transferred from the runout table to the cooling bed and simultaneously grouped by means of dog-type or pusher-type devices. These transfer devices slide the products onto the cooling bed. The sliding action causes scratches and/or nicks to be formed in the products. The formation of scratches and/or nicks is enhanced by the fact that the products are hot. The scratches and/or nicks must be removed before the products are converted into finished items since the latter will otherwise exhibit defects. Removal of the scratches and/or nicks is not only time-consuming but is also accompanied by a loss of material.

OBJECTS AND SUMMARY OF THE INVENTION

It is an object of the invention to provide a transfer arrangement for metal processing installations which is capable of transporting products with less damage than heretofore.

Another object of the invention is to provide a transfer arrangement for metal processing installations which is capable of transporting products at a relatively rapid rate.

An additional object of the invention is to provide a transfer arrangement for metal processing installations which enables the economy of operation to be improved.

It is also an object of the invention to provide a transfer arrangement for metal processing installations which is relatively uncomplicated.

Still a further object of the invention is to provide a transfer arrangement for metal processing installations which is capable of transporting products in an efficient yet gentle manner.

A concomitant object of the invention is to provide a transfer method for metal processing installations which permits products to be transported with less damage than heretofore.

Yet another object of the invention is to provide a transfer method for metal processing installations which makes it possible to improve the economy of operation.

It is further an object of the invention to provide a transfer method for metal processing installations which permits products to be transported in an efficient yet gentle manner.

The preceding objects, as well as others which will become apparent as the description proceeds, are achieved by the invention.

One aspect of the invention resides in an arrangement for transferring products in metal processing installations. The arrangement includes support means for temporarily supporting a plurality of articles or products at a plurality of predetermined locations spaced by a predetermined distance. The support means has a support surface for the products which is located in a predetermined plane. Transport means is provided for the products and is movable between a first location and a second location to which the products are to be transferred. The arrangement further comprises guide means for the transport means. The guide means defines a predetermined path which connects the first and second locations and traverses the predetermined locations. The guide means and the transport means are designed such that the transport means removes the products from the support means along a direction which makes an acute angle with the predetermined plane of the support surface. The guide means and the transport means are further designed in such a manner that the transport means groups the products during travel from the first to the second location. Upon arrival at the second location, the products abut or are spaced by a distance smaller than that at the first location. Drive means is provided for moving the transport means along the predetermined path.

The arrangement is well-suited for use in continuous casting apparatus.

Since the transport means in the arrangement according to the invention removes the products from the support means along a direction which makes an acute angle with the plane of the surface on which the products rest, sliding movement of the products on the support means is reduced to a minimum thereby reducing the chances of damage to the products. The arrangement in accordance with the invention thus enables the products to be transferred at a relatively rapid rate yet in a reasonably gentle manner. Furthermore, due to the fact that the transport means groups the products, efficient handling of the products is made possible.

Another aspect of the invention resides in a method of transferring products in metal processsing installations. The method involves conveying a plurality of articles or products onto a support surface loaded in a predetermined plane so that the products are supported at a plurality of predetermined locations spaced by a predetermined distance. The products are subsequently transferred from the predetermined locations to another location. This transferring step includes removal of the products from the support surface along a direction which makes an acute angle with the predetermined plane, and grouping of the products so that the latter abut or are spaced by a distance smaller than that between the predetermined locations upon arrival at the other location.

The method is well-suited for use in continuous casting apparatus.

As is the case for the apparatus according to the invention, the method of the invention makes it possible to transfer products in a reasonably gentle manner and to handle the products efficiently.

The novel features which are considered as characteristic of the invention are set forth in particular in the appended claims. The improved transfer arrangement itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
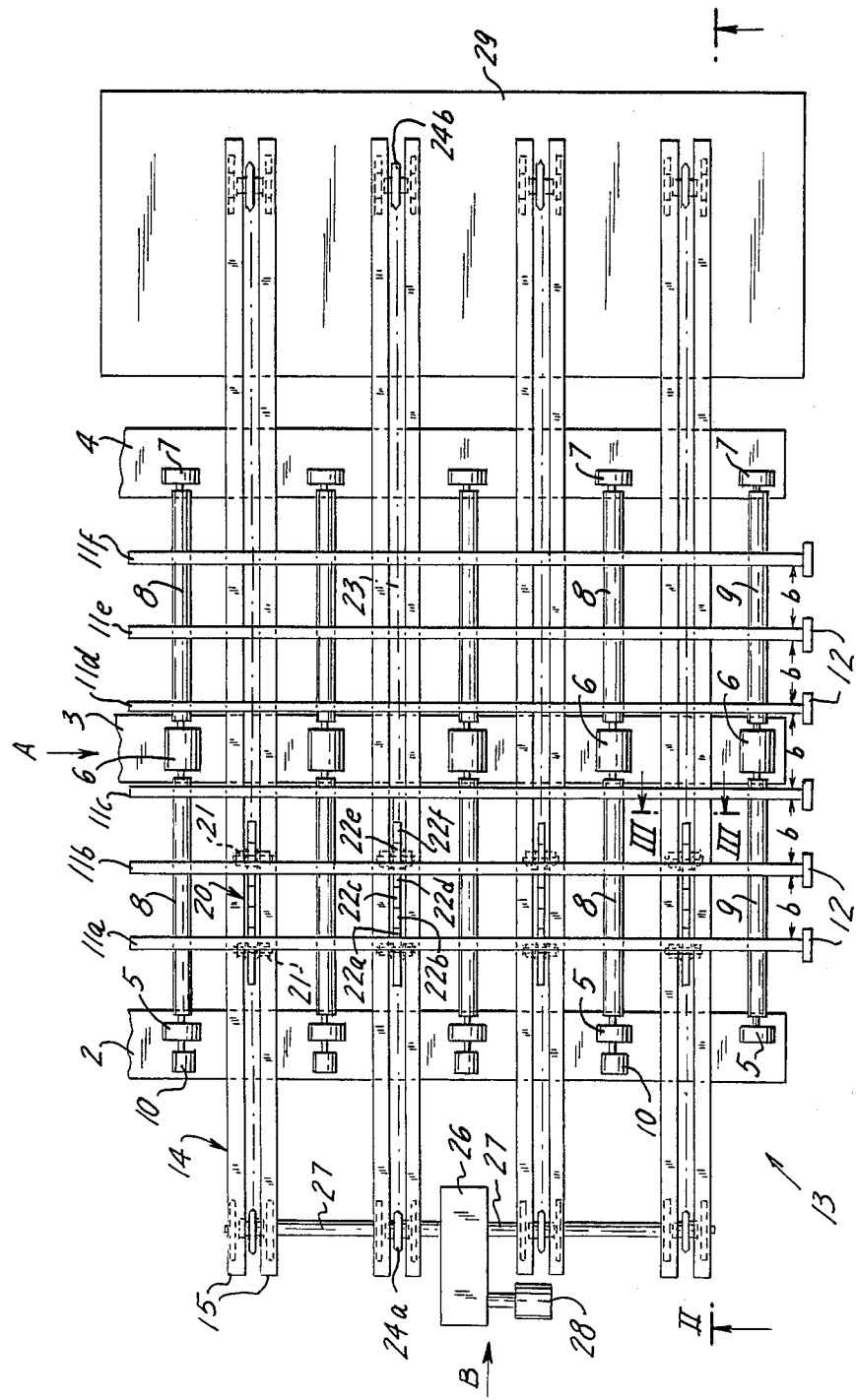
FIG. 1 is a plan view of a transfer arrangement in accordance with the invention.
Figure 3:
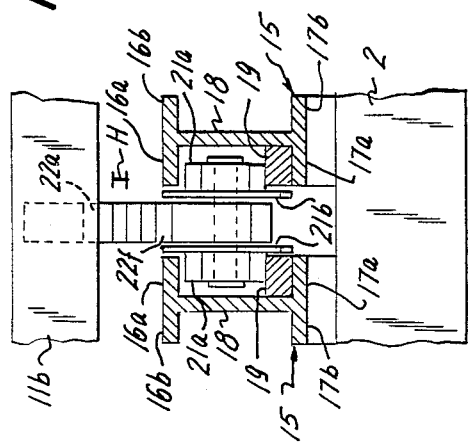
FIG. 3 is a cross-sectional view as seen in the direction of the arrows III—III of FIG. 1.
Figure 2:
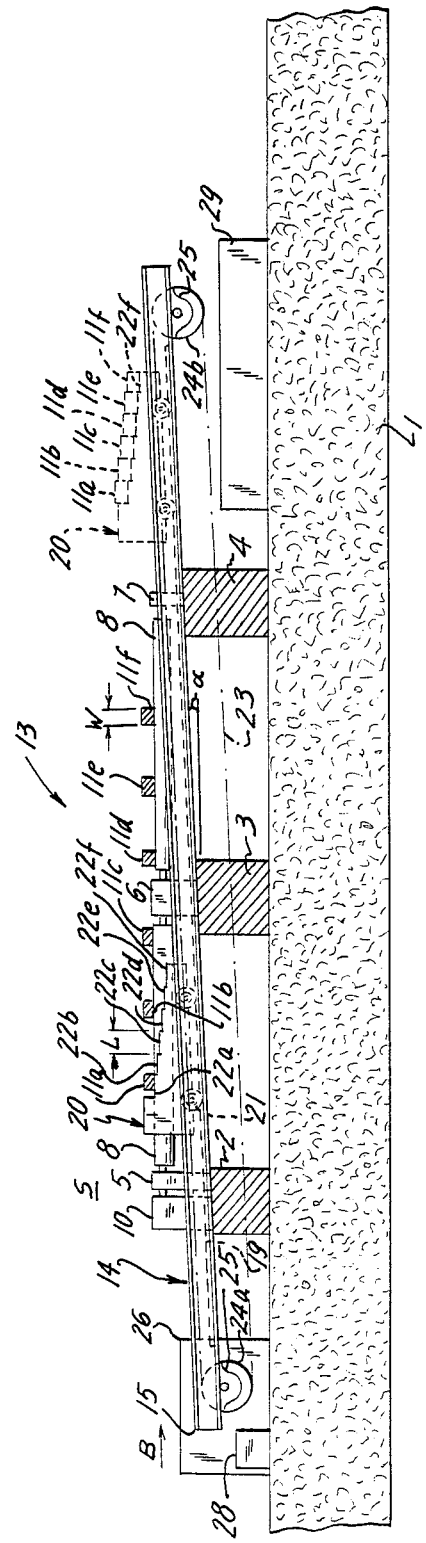
FIG. 2 is a cross-sectional elevational view as seen in the direction of the arrows II—II of FIG. 1.

Referring to FIGS. 1–3, the reference numeral 1 identifies a foundation. The foundation 1 carries a series of elongated beams 2, 3 and 4 which progressively increase in height from the left to the right in FIGS. 1 and 2. The beams 2–4 respectively carry bearing units 5, 6 and 7 which are spaced longitudinally of the beams 2–4. The bearing units 5–7 rotatably support pairs of driven rollers 8 as well as a pair of non-driven rollers 9. The rollers 8 and 9 bridge the gap between the beams 2 and 3 as well as the gap between the beams 3 and 4. The rollers 8 are driven by conventional motors 10 which are mounted on the beam 2 and are coupled to the rollers 8 via the bearing units 5.

The rollers 8 and 9 are assumed to constitute the runout table of a conventional continuous casting apparatus. The casting apparatus is here a six-strand billet casting machine. The six billets 11a, 11b, 11c, 11d, 11e and 11f which are continuously cast and then cut to size in the casting apparatus are discharged onto the runout table 8, 9 in the direction of the arrow A at respective locations separated by a spacing b as considered transverse to the direction A. The runout table 8, 9 defines a support surface for the billets 11a–11f which is located in a horizontal plane. Travel of the billets 11a–11f beyond the runout table 8, 9 is prevented by means of conventional end stops 12 which are disposed in the paths of the billets 11a–11f at the end of the runout table 8, 9.

The billets 11a–11f are at a very high temperature, and may even be red hot, upon being discharged onto the runout table 8, 9. In order to cool the billets 11a–11f, the latter are transferred to a conventional cooling bed which forms no part of the invention per se.

As part of the transfer operation, the billets 11a–11f are transported to one side of the runout table 8, 9 by means of a transfer arrangement 13 designed in accordance with the invention. The transfer arrangement 13 transports the billets 11a–11f along a direction which is indicated by the arrow B and is normal to the direction A along which the billets 11a–11f are discharged onto the runout table 8, 9.

The transfer arrangement 13 includes a series of guide units 14 which are spaced in the direction A. Each of the guide units 14 extends along the direction B from a location left of the beam 2 to a location right of the beam 4. The guide units 14 thus traverse the runout table 8, 9. One of the guide units 14 passes between a pair of rollers 9 and the neighboring pair of rollers 8 of the runout table 8, 9. The remaining guide units 14 pass between neighboring pairs of roller 8.

The guide units 14 are fixedly mounting on top of the beams 2–4. As shown in FIG. 2, the upper surfaces of the beams 2–4 are upwardly inclined in the direction B. The guide units 14, which rest on the upper surfaces of the beams 2–4, are consequently also upwardly inclined in the direction B. The upper surfaces of the beams 2–4 make an acute angle alpha with the horizontal and thus with the plane of the support surface defined by the runout table 8, 9. It follows that the guide units 14 are likewise inclined to the plane of this support surface at the acute angle alpha. The angle alpha is preferably substantially smaller than 90° and will generally be less than 10°.

As seen in FIGS. 1 and 3, each of the guide units 14 includes a pair of spaced I-beams 15. Each of the I-beams 15 has a horizontal upper flange comprising an inner portion 16a and an outer portion 16b. Each of the I-beams 15 further has a horizontal lower flange comprising an inner portion 17a and an outer portion 17b. The flanges 16a, 16b and 17a, 17b of the I-beams 15 are separated by vertical webs 18. The flange portions 16a and 17a of each I-beam 15 are superimposed with one another as are the flange portions 16b and 17b. In each guide unit 14, the inner flange portions 16a of the two I-beams 15 confront one another as do the inner flange portions 17a.

A bar or rail 19 is mounted on each of the inner flange portions 17a. Each of the rails 19 extends over almost the entire length of the respective I-beam 15. However, the ends of the rails 19 are inwardly spaced from the ends of the I-beams 15.

The rails 19 constitute tracks for carriages or transport units 20. One of the carriages 20 is mounted on each of the guide units 14 for movement back-and-forth along the same. The carriages 20 are aligned with one another in the direction A. Each of the guide units 14 guides the respective carrige 20 along a path which is upwardly inclined in the direction B and makes the acute angle alpha with the plane of the support surface defined by the runout table 8, 9.

Each of the carriages 20 comprises two pairs of wheels 21. In each guide unit 14, one wheel 21 of each pair is guided by the flanges 16a and 17a of one of the I-beams 15 while the other wheel 21 of each pair is guided by the flanges 16a and 17a of the other I-beam 15. The wheels 21 are of the type used on railway cars and respectively include a bearing portion 21a and a flange 21b. The bearing portion 21a of each wheel 21 is received between the flanges 16a and 17a of the corresponding I-beams 15 and rides on the associated rail 19. The flange 21b of each wheel 21, on the other hand, is located in the space between the two I-beams 15 of the respective guide unit 14. The flanges 21b prevent the carriages 20 from undergoing excessive lateral displacement.

Each of the carriages 20 is provided with a series of steps or step sections 22a, 22b, 22c, 22d, 22e 22f. The various steps 22a are aligned in the direction A as are the various steps 22b, the various steps 22c, the various steps 22d, the various steps 22e, and the various steps 22f. The number of steps 22a-22f is equal to the maximum number of billets 11a-11f to be transferred at one time. In the present case, there are six steps 22a-22f since the continuous casting apparatus which discharges the billets 11a-11f is a six-strand machine.

Each of the steps 22a-22f has a carrying surface which is arranged to receive one of the billets 11a-11f. The carrying surfaces are generally flat and horizontal, that is, the carrying surfaces are parallel to the plane of the support surface defined by the runout table 8, 9.

Figure 2A:
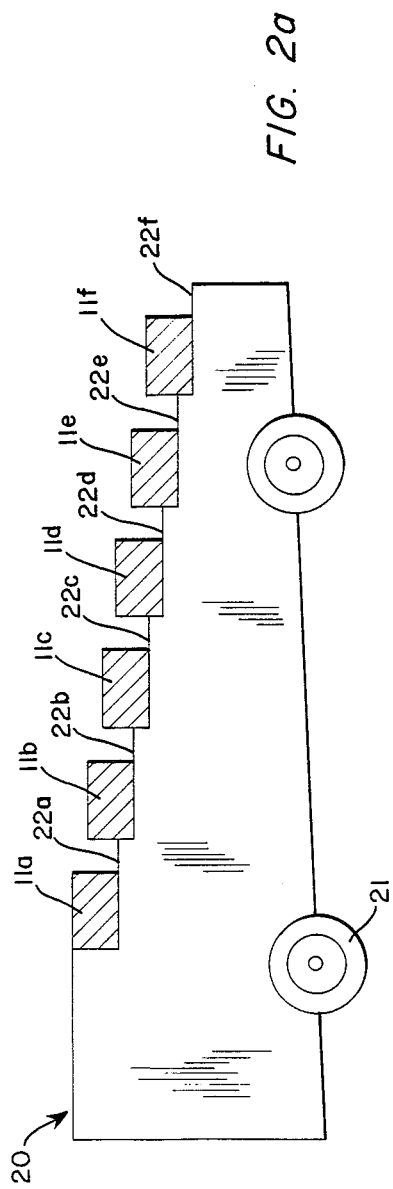
FIG. 2a is a side elevational view of another embodiment of a carriage constituting part of the arrangement of FIG. 1.
Figure 2B:
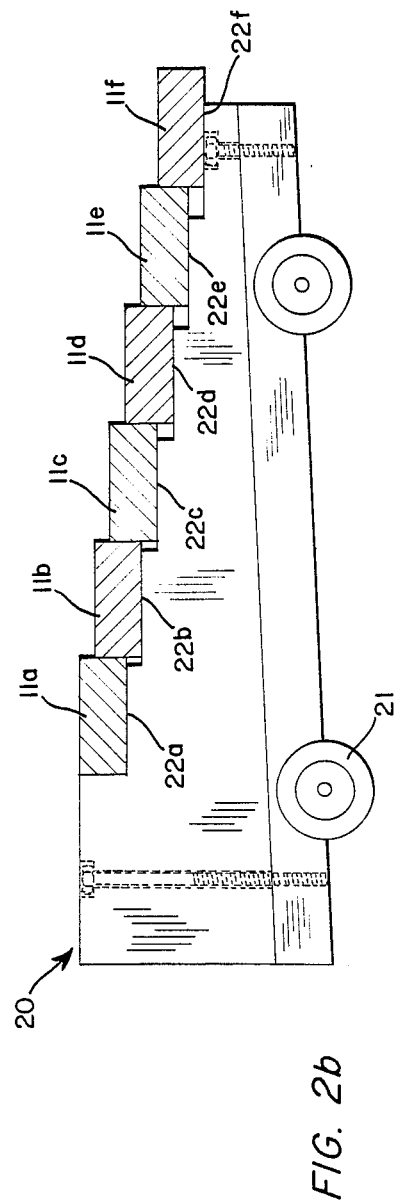
FIG. 2b is a view similar to that of FIG. 2a showing a further embodiment of the carriage.

Each of the steps 22a-22f has a length L in the direction B while each of the billets 11a-11f has a width W in the direction B. The length L of the steps 22a-22f may be larger than the width W of the billets 11a-11f as shown in FIG. 2a but is preferably equal to or slightly smaller than the width W as shown in FIGS. 2 and 2b, respectively.

Each of the steps 22b-22f has a height H. The angle alpha between the guide units 14 and the plane of the support surface defined by the runout table 8, 9 is proportional to the height H. The angle alpha is further proportional to the spacing b between neighboring ones of the billets 11a-11f. The angle alpha increases with increasing height H and decreasing spacing b.

The steps 22a-22f are shown as being formed directly in the carriages 20. However, it is possible to make the steps 22a-22f for each carriage 20 part of a stepped unit which is separate from and may be releasably secured to the respective carriage 20. This is illustrated in FIG. 2b where a stepped unit is mounted on a carriage 20 via connectors such as bolts. In this manner, the steps 22a-22f may be replaced, e.g. upon becoming worn or damaged.

Each of the carriages 20 is engaged by a chain 23. The chain 23 for each carriage 20 passes around a pair of sprockets 24a and 24b located at opposite ends of the respective guide unit 14. The sprockets 24a and 24b are situated between the ends of the rails 19 and the neighboring ends of the corresponding I-beams 15. The sprockets 24a and 24b are rotatably mounted on brackets 25 which are secured to the I-beams 15. The sprockets 24a are connected to a common reducer 26 via drive shafts 27. The reducer 26 is driven by a reversible motor 28. By virtue of this construction, the carriages 20 travel along the guide units 14 in synchronism.

With reference to FIG. 2, the transfer arrangement of FIGS. 1-3 operates as follows:

The carriages 20 are initially positioned at a starting position S to await the arrival of the billets 11a-11f at the runout table 8, 9. At the position S, the carriages 20 are somewhat below and to the left of the positions assumed by the billets 11a-11f on the runout table 8, 9.

Once the billets 11a-11f have arrived at the runout table 8, 9, the carriages 20 are moved towards a terminal position T. The terminal position T is situated on the opposite side of the runout table 8, 9 from the starting position S, that is, to the right of the positions occupied by the billets 11a-11f on the runout table 8, 9.

It is not necessary for each of the billets 11a-11f to arrive at the runout table 8, 9 before the carriages 20 are moved towards the terminal position T. If one or more strands of the continuous casting apparatus are not operating, the transfer arrangement may be used to transfer the billets which issue from the remaining strands. In the present description, it is assumed that all of the billets 11a-11f have arrived at the runout table 8, 9.

The carriages 20 approach the billets 11a-11f from below during travel from the starting position S to the terminal position T. The proportional relationship between the angle of inclination angle, the height H of the steps 22b-22f and the distance of separation b of the billets 11a-11f is such that the billets 11a-11f are consecutively or sequentially engaged by the carriages 20. The billet 11a, which is the first to be engaged, is received by the carrying surfaces of the steps 22a. The steps 22a arrive at and engage the billet 11a from below. Since the plane in which the billet 11a rests on the runout table 8, 9 makes the angle alpha with the guide units 14, the steps 22a move in a direction which likewise makes the angle alpha with such plane. The steps 22a thus lift the billet 11a from the runout table 8, 9 along this direction. Consequently, little, if any, sliding movement of the billet 11a on the runout table 8, 9 occurs. This reduces or eliminates scratching and/or marring of the billet 11a. In general, removal of the billet 11a from the runout table 8, 9 is accomplished relatively gently. This is particularly important in view of the fact that the billet 11a is very hot and is accordingly very susceptible to being damaged.

As the carriages 20 continue to move from the starting position S to the terminal position T, the billets 11b-11f are sequentially removed from the runout table 8, 9 by the respective stesp 22b-22f. Removal of the billets 11b-11f from the runout table 8, 9 occurs in the same manner as removal of the billet 11a so that scratching and/or marring of the billets 11b-11f is reduced or eliminated.

The disposition of the carriages 20 and the billets 11a-11f at the terminal position T is indicated in phantom lines. The carriages 20 are positioned to the right of and somewhat above the locations of the runout table 8, 9 previously occupied by the billets 11a-11f. Each of the billets 11a-11f rests on a respective one of the steps 22a-22f. While the billets 11a-11f were originally spaced from one another by the distance b, the billets 11a-11f now form a group in which neighboring ones of the billets 11a-11f are either in abutment as illustrated in FIGS. 2 and 2b or are spaced from one another by a distance smaller than the spacing b as illustrated in FIG. 2a.

The carriages 20 travel from the starting position S to the terminal position T continuously, that is, without stopping. In this manner, the billets 11a-11f are removed from the runout table 8, 9 relatively rapidly. Upon arrival at the terminal position T, the carriages 20 are stopped. This may be accomplished automatically by means of conventional limit switches or the like.

At the terminal position T, the billets 11a-11f are lifted from the carriages 20 by means of a conventional mechanism 29 which does not form part of the invention per se. By way of example, the mechanism 29 may be a lifting device such as a walking beam cooling bed having a parallelogram linkage; a C-hook; or a conveyor. If desired, the mechanism 29 may be activated automatically in a conventional manner upon arrival of the carriages 20 at the terminal position T to lift the billets 11a–11f from the carriages 20.

When the billets 11a–11f have been lifted from the carriages 20, the latter are returned to the starting position S to await the arrival of a fresh batch of billets.

Figure 4:
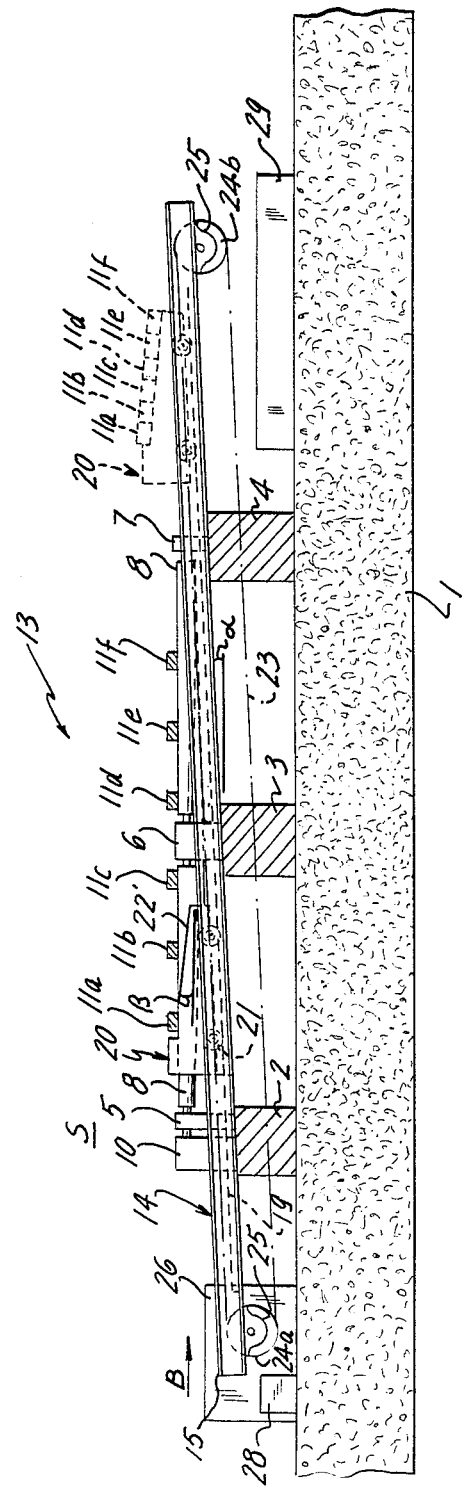
FIG. 4 is a view similar to that of FIG. 2 but illustrating another embodiment of the transfer arrangement.

FIG. 4 illustrates another embodiment of the transfer arrangement in accordance with the invention. In FIG. 4, the same reference numerals as in FIGS. 1-3 have been used to identify like elements.

The embodiment of FIG. 4 differs from that of FIGS. 1-3 in that the steps 22a–22f are replaced by continuous planar surfaces 22'. The carrying surfaces 22' are inclined to the horizontal, and thus to the plane of the support surface defined by the runout table 8, 9, at an acute angle beta. The angle beta is preferably substantially smaller than 90° and will generally be less than 10°. The carrying surfaces 22' slope in a direction opposite to that of the guide units 14, that is, the carrying surfaces 22' are downwardly inclined in a direction from the starting position S to the terminal position T. The angle of inclination alpha of the guide units 14 is here proportional to the angle of inclination beta of the carrying surfaces 22' as well as to the distance b between neighboring ones of the billets 11a–11f. It is preferred for the angles alpha and beta to be equal.

The carrying surfaces 22' are illustrated as being formed directly on the carriages 20. It is possible, however, for each of the carrying surfaces 22' to be formed on a wedge-like unit which is separate from but may be releasably secured to the respective carriage 20. This enables the carrying surfaces 22' to be replaced, e.g. when the carrying surfaces 22' become worn or damaged.

The transfer arrangement of FIG. 4 operates in virtually the same manner as that of FIGS. 1-3. The only difference is that the billets 11a–11f in FIG. 4 are sequentially removed from the runout table 8, 9 by carrying surfaces 22' each of which is common to all of the billets 11a–11f rather than by the individual steps 22a–22f.

It is to be pointed out that the flange portions 16b and 17b of the I-beams 15 may be omitted. In other words, the I-beams may be replaced with C-shaped beams.

In the illustrated embodiments, the guide units 14 define a linear path of limited extent. However, it is within the purview of the invention to provide transport units which travel along an endless path. For example, the transport units may be in the form of endless belts or endless chains which respectively carry one or more stepped units and/or one more wedge-like units. The runs of the belts or chains would be inclined in the same manner as the guide units 14 which may then be replaced by sets of sprocket wheels or guide rollers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An arrangement for transferring products in metal processing installations, particularly for use in continuous casting apparatus, comprising:

(a) support means for temporarily supporting a plurality of articles at a plurality of predetermined locations spaced by a predetermined distance, said support means having a support surface for the articles located in a predetermined plane;

(b) transport means for the articles moveable between a first location and a second location to which the articles are to be transferred;

(c) guide means for said transport means defining a predetermined path which connects said first and second locations and traverses said predetermined locations, said guide means and said transport means being designed such that said transport means removes the articles from said support means along a direction which makes an acute angle with said predetermined plane to thereby reduce sliding movement of the articles on said support means, and said guide means and said transport means being further designed such that said transport means groups the articles during travel from said first to said second location so that the articles abut or are spaced by a distance smaller than said predetermined distance upon arrival at said second location; and (d) drive means for moving said transport means along said predetermined path.

2. An arrangement as defined in claim 1, wherein said predetermined path is inclined with reference to said predetermined plane.

3. An arrangement as defined in claim 2, wherein said predetermined path and said predetermined plane define an angle of less than about 10°.

4. An arrangement as defined in claim 1, wherein said predetermined path is upwardly inclined from said first location to said second location.

5. An arrangement as defined in claim 4, wherein said predetermined plane is substantially horizontal.

6. An arrangement as defined in claim 1, wherein said transport means has a carrying surface which substantially parallels said predetermined plane.

7. An arrangement as defined in claim 1, wherein said transport means has a carrying surface which is inclined with reference to said predetermined plane.

8. An arrangement as defined in claim 7, wherein said carrying surface and said predetermined plane define an angle of less than about 10°.

9. An arrangement as defined in claim 7, wherein said carrying surface is downwardly inclined in a direction from said first location to said second location.

10. An arrangement as defined in claim 1, wherein said guide means and said transport means are designed such that the latter sequentially removes successive articles from said support means during travel from said first location to said second location.

11. An arrangement as defined in claim 1, wherein said predetermined path is inclined with reference to said predetermined plane at an angle which is substantially proportional to said predetermined distance.

12. An arrangement as defined in claim 1, said transport means having a carrying surface which is inclined with reference to said predetermined plane at a first angle; and wherein said predetermined path is inclined with reference to said predetermined plane at a second angle which is substantially proportional to said first angle.

13. An arrangement as defined in claim 12 wherein said carrying surface and said predetermined path are inclined in opposite directions.

14. An arrangement as defined in claim 13, wherein said first and second angles are at least approximately equal.

15. An arrangement as defined in claim 1, wherein said transport means has a carrying surface which is inclined with reference to said predetermined plane at an angle substantially proportional to said predetermined distance.

16. An arrangement as defined in claim 1, wherein said transport means is provided with a plurality of steps, and each of said steps is designed to remove an article from said supporting means and to subsequently carry such article.

17. An arrangement as defined in claim 16, wherein said transport means comprises a stepped unit which is releasably secured to said transport means, and said steps are formed on said stepped unit.

18. An arrangement as defined in claim 16, wherein said guide means and said steps are designed such that successive steps sequentially remove successive articles from said support means during travel of said transport means from said first location to said second location.

19. An arrangement as defined in claim 16, wherein the number of said steps equals the number of said predetermined locations.

20. An arrangement as defined in claim 16, wherein the dimension of each step approximates the dimension of the corresponding article as considered in a direction from said first location to said second location.

21. An arrangement as defined in claim 16, wherein the dimension of each step is smaller than the dimension of the corresponding article as considered in a direction from said first location to said second location.

22. An arrangement as defined in claim 16, wherein the dimension of each step is larger than the dimension of the corresponding article as considered in a direction from said first location to said second location.

23. An arrangement as defined in claim 16, said steps having a predetermined height; and wherein said predetermined path is inclined with reference to said predetermined plane at an angle which is substantially proportional to said predetermined height.

24. An arrangement as defined in claim 16, wherein said transport means comprises a plurality of transport units which are spaced transversely of said predetermined path and are movable in synchronism to thereby permit the transfer of articles which are elongated transversely of said predetermined path, each of said steps being divided into sections which are respectively situated on said transport units and are aligned transversely of said predetermined path.

25. An arrangement as defined in claim 1, wherein said transport means comprises a plurality of transport units which are spaced transversely of said predetermined path and are movable in synchronism to thereby permit the transfer of articles which are elongated transversely of said predetermined path.

26. An arrangement as defined in claim 25, wherein said drive means comprises a common drive for said transport units.

27. An arrangement as defined in claim 25, said support means comprising a plurality of support units which are spaced transversely of said predetermined path; and wherein at least one of said transport units is flanked by a pair of said support units.

28. An arrangement as defined in claim 25, wherein said guide means comprises a guide unit for each of said transport units.

29. An arrangement as defined in claim 1, said transport means having at least one wheel; and wherein said guide means comprises at least one guide member having a pair of spaced, overlapping flanges, and said one wheel is guided between said flanges.

30. An arrangement as defined in claim 29, said transport means having an additional wheel which is spaced from said one wheel transversely of said predetermined path; and wherein said guide means comprises an additional guide member having a pair of spaced, overlapping additional flanges, and said additional wheel is guided between said additional flanges.

31. An arrangement as defined in claim 29, wherein said guide member comprises a substantially C-shaped beam.

32. An arrangement as defined in claim 29, wherein said guide member comprises a substantially I-shaped beam.

33. An arrangement as defined in claim 1, wherein said transport means is provided with wheels.

34. An arrangement as defined in claim 33, wherein said guide means comprises spaced rails which bridge said first and second locations, and said transport means is designed to travel on said rails.

35. An arrangement as defined in claim 1, comprising a foundation; and wherein said support means and said guide means are fixedly mounted on said foundation.

36. An arrangement as defined in claim 1, wherein said support means is designed to receive the articles along a predetermined direction transverse to said predetermined path.

37. An arrangement as defined in claim 36, wherein said predetermined direction is substantially normal to said predetermined path.

38. An arrangement as defined in claim 1, wherein said predetermined path is substantially linear.

39. An arrangement as defined in claim 1, comprising removing means at said second location for removing the articles from said transport means.

40. An arrangement as defined in claim 1, wherein said support means comprises a plurality of rollers.

41. An arrangement as defined in claim 1, wherein said support means comprises a runout table of a continuous casting apparatus.

42. An arrangement as defined in claim 1, wherein said drive means is reversible to thereby permit movement of said transport means back-and-forth along said predetermined path.

43. An arrangement as defined in claim 1, wherein said guide means and said transport means are designed such that said transport means arrives at said predetermined locations and engages the articles from below.

44. A method of transferring products in metal processing installations, particularly for use in continuous casting apparatus, comprising the steps of:
  (a) conveying a plurality of articles onto a support surface located in a predetermined plane so that said articles are supported at a plurality of predetermined locations spaced by a predetermined distance; and
  (b) transferring said articles from said predetermined locations to another location, the transferring step including the operations of removing said articles from said support surface along a direction which makes an acute angle with said predetermined plane to thereby reduce sliding movement of said articles on said support surface, and grouping said articles so that said articles abut or are spaced by a distance smaller than said predetermined distance upon arrival at said other location.

45. A method as defined in claim 44, wherein the removing operation is performed by engaging said articles from below and lifting said articles from said support surface.

46. A method as defined in claim 44, wherein successive articles are sequentially removed from said support surface during the transferring step.

47. A method as defined in claim 44, wherein said support surface is substantially horizontal.

48. A method as defined in claim 44, wherein said articles are transferred from said predetermined locations to said other location along substantially linear paths.

49. A method as defined in claim 44, wherein said articles are conveyed onto said support surface along a direction which is transverse to the direction of movement of said articles during the transferring step.

50. A method as defined in claim 44, wherein said articles are at an elevated temperature during the conveying and transferring steps.

51. A method as defined in claim 44, comprising the step of continuously casting said articles prior to the conveying step.

52. A method as defined in claim 51, wherein said articles consist essentially of steel.

53. A method as defined in claim 44, wherein said angle is less than about 10°.

* * * * *